United States Patent
Huang et al.

(10) Patent No.: US 9,576,172 B2
(45) Date of Patent: Feb. 21, 2017

(54) SYSTEMS AND METHODS FOR SIMULTANEOUSLY PROVIDING AND READING MACHINE-READABLE CODES

(71) Applicant: Facebook, Inc., Menlo Park, CA (US)

(72) Inventors: Xun Wilson Huang, Alameda, CA (US); Xiaoliang Wei, Sunnyvale, CA (US); Vladimir Milosevic, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/488,092

(22) Filed: Sep. 16, 2014

(65) Prior Publication Data
US 2016/0078143 A1   Mar. 17, 2016

(51) Int. Cl.
G06K 7/14        (2006.01)
G06K 7/10        (2006.01)
G06Q 50/00       (2012.01)
G06K 19/06       (2006.01)

(52) U.S. Cl.
CPC .............. *G06K 7/1404* (2013.01); *G06Q 50/01* (2013.01); *G06F 2203/04803* (2013.01); *G06K 7/1095* (2013.01); *G06K 7/10722* (2013.01); *G06K 19/06112* (2013.01); *G06Q 50/00* (2013.01)

(58) Field of Classification Search
CPC .............. G06Q 50/01; G06F 17/30002; G06F 17/30725; G06K 19/06037; G06K 19/06112; G06K 7/1417
See application file for complete search history.

(56) References Cited

U.S. PATENT DOCUMENTS

| | | | | |
|---|---|---|---|---|
| 7,221,910 B2* | 5/2007 | Ishii | ................... | H04M 1/72527 370/329 |
| 8,256,673 B1* | 9/2012 | Kim | ....................... | G06K 7/1095 235/437 |
| 8,573,499 B1* | 11/2013 | Boyle | ............... | G06K 19/06037 235/375 |
| 9,251,119 B2* | 2/2016 | Denny | ..................... | G06F 17/00 |
| 2006/0056707 A1* | 3/2006 | Suomela | ............. | G06K 7/10712 382/232 |
| 2010/0050129 A1* | 2/2010 | Li et al. | ......................... | 715/849 |
| 2011/0101086 A1* | 5/2011 | Yach | ...................... | G06Q 10/10 235/375 |
| 2012/0168493 A1* | 7/2012 | Worms | ........................ | 235/375 |

(Continued)

OTHER PUBLICATIONS

F. McPherson, "Scan to Add a Facebook Friend on Android Phones", May 6, 2011; all pages.*

*Primary Examiner* — Christopher Stanford
(74) *Attorney, Agent, or Firm* — Sheppard Mullin Richter & Hampton LLP

(57) ABSTRACT

Systems, methods, and non-transitory computer-readable media can acquire a first machine-readable code. The first machine-readable code can be provided on a display element. A reader tool for reading a second machine-readable code can be provided on the display element in conjunction with the providing of the first machine-readable code on the display element. In some instances, the second machine-readable code can be read using the reader tool. The second machine-readable code can be processed to access information represented by the second machine-readable code. One or more operations can be performed based on the information represented by the second machine-readable code.

20 Claims, 10 Drawing Sheets

(56) References Cited

U.S. PATENT DOCUMENTS

| | | | | |
|---|---|---|---|---|
| 2012/0211557 A1* | 8/2012 | Harris | | 235/375 |
| 2012/0289290 A1* | 11/2012 | Chae | | G06F 3/0488 455/566 |
| 2012/0304107 A1* | 11/2012 | Nan et al. | | 715/781 |
| 2013/0043302 A1* | 2/2013 | Powlen et al. | | 235/375 |
| 2013/0221084 A1* | 8/2013 | Doss et al. | | 235/375 |
| 2014/0084067 A1* | 3/2014 | Vanderhulst | | H04B 10/116 235/462.01 |
| 2014/0282923 A1* | 9/2014 | Narayan | | G06F 21/44 726/5 |
| 2015/0187034 A1* | 7/2015 | Mullen | | G06Q 50/22 235/375 |

\* cited by examiner

SYSTEMS AND METHODS FOR SIMULTANEOUSLY PROVIDING AND READING MACHINE-READABLE CODES

FIELD OF THE INVENTION

The present technology relates to the field of machine-readable codes. More particularly, the present technology relates to techniques for simultaneously providing and reading machine-readable codes.

BACKGROUND

Today, people often utilize computing devices (or systems) for a wide variety of purposes. Users can use their computing devices, for example, to interact with one another, create content, and access content. In some cases, a user can utilize his or her computing device to read or scan a machine-readable code, such as a Quick Response (QR) code. The machine-readable code can provide the user with access to content, such as a link or a message.

Conventional approaches to utilizing machine-readable codes generally involve providing a machine-readable code in one instance and then reading or scanning the machine-readable code in a separate instance. However, this manner of utilizing machine-readable codes in accordance with conventional approaches can be inconvenient and inefficient. As such, conventional approaches can create challenges for or reduce the overall user experience associated with utilizing machine-readable codes.

SUMMARY

Various embodiments of the present disclosure can include systems, methods, and non-transitory computer readable media configured to acquire a first machine-readable code. The first machine-readable code can be provided on a display element. A reader tool for reading a second machine-readable code can be provided on the display element in conjunction with the providing of the first machine-readable code on the display element.

In an embodiment, the second machine-readable code can be read using the reader tool. The second machine-readable code can be processed to access information represented by the second machine-readable code. One or more operations can be performed based on the information represented by the second machine-readable code.

In an embodiment, the second machine-readable code can be provided on a second display element of a second computing system. In some cases, the reading of the second machine-readable code can be performed based on placing a rear surface of the computing system which exposes a camera of the computing system at least partially on top of a front surface of the second computing system which exposes the second display element.

In an embodiment, the first machine-readable code can represent, at least in part, information associated with a unique identifier for a first user of a social networking system. In some cases, the information represented by the second machine-readable code can be associated with a unique identifier for a second user of the social networking system.

In an embodiment, the performing of the one or more operations based on the information represented by the second machine-readable code can include at least one of connecting the first user and the second user in the social networking system, requesting to connect the first user and the second user in the social networking system, or accessing a page associated with the second user.

In an embodiment, the information represented by the second machine-readable code can be associated with a unique identifier for a group within a social networking system. In some instances, the performing of the one or more operations based on the information represented by the second machine-readable code can include at least one of accessing the group within the social networking system, receiving an invitation to join the group, requesting to join the group, or transmitting a response to join the group.

In an embodiment, the information represented by the second machine-readable code can be associated with a unique identifier for an event within a social networking system. In some cases, the performing of the one or more operations based on the information represented by the second machine-readable code can include at least one of accessing the event within the social networking system, receiving an invitation to the event, requesting to be invited to the event, or transmitting a response indicating attendance for the event.

In an embodiment, the information represented by the second machine-readable code can be associated with a unique identifier for a page within a social networking system. In some instances, the performing of the one or more operations based on the information represented by the second machine-readable code can include at least one of accessing the page within the social networking system, supporting the page within the social networking system, or sharing the page within the social networking system.

In an embodiment, the information represented by the second machine-readable code can be associated with a unique identifier for a content item within a social networking system. In some cases, the performing of the one or more operations based on the information represented by the second machine-readable code can include at least one of accessing the content item, storing the content item, supporting the content item within the social networking system, or sharing the content item within the social networking system.

In an embodiment, the information represented by the second machine-readable code can be associated with a unique identifier for an online resource. In some instances, the performing of the one or more operations based on the information represented by the second machine-readable code can include accessing the online resource.

In an embodiment, the first machine-readable code can be different from the second-machine readable code. In some cases, the first machine-readable code can include at least one of a first Quick Response (QR) code, a first barcode, or a first machine-readable tag. In some instances, the second machine-readable code can include at least one of a second Quick Response (QR) code, a second barcode, or a second machine-readable tag.

In an embodiment, the reader tool can include at least one of a Quick Response (QR) code scanner tool, a barcode reader tool, or a tag reader tool.

In an embodiment, information to be represented by the first machine-readable code can be identified prior to the acquiring of the first machine-readable code. The information can be transmitted to one or more servers prior to the acquiring of the first machine-readable code. In some cases, the first machine-readable code can be generated by the one or more servers to represent, at least in part, the information.

In an embodiment, the acquiring of the first machine-readable code can include at least one of: 1) receiving the first machine-readable code in image format or 2) receiving image data associated with the first machine-readable code and generating the first machine-readable code based on the image data.

In an embodiment, the processing of the second machine-readable code to access the information represented by the second machine-readable code can further comprise transmitting the second machine-readable code to one or more servers. The information represented by the second machine-readable code can be received from the one or more servers.

In an embodiment, at least one of the first machine-readable code or the second machine-readable code can expire based on at least one of a system setting or a user setting.

In an embodiment, the providing of the reader tool in conjunction with the providing of the first machine-readable code can be performed subsequent to an user interaction with a search tool provided by the computing system.

In an embodiment, the providing of the reader tool in conjunction with the providing of the first machine-readable code can be performed subsequent to detecting a swipe gesture from an edge of the display element.

Many other features and embodiments of the invention will be apparent from the accompanying drawings and from the following detailed description.

Figure 1:
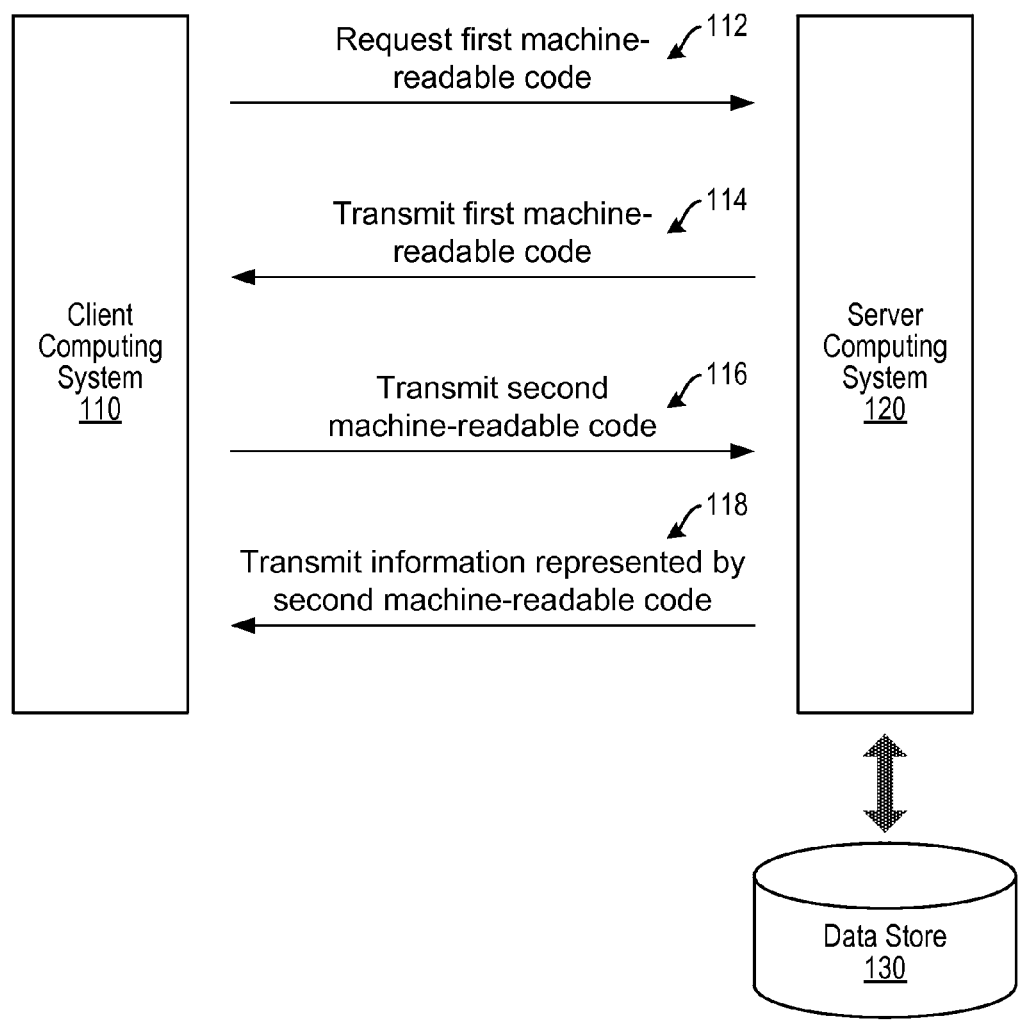
FIG. 1 illustrates an example system associated with simultaneously providing and reading machine-readable codes, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Simultaneously Providing and Reading Machine-Readable Codes

People use computing devices (or systems) for various purposes. Computing devices can provide different kinds of functionality. Users can utilize their computing devices to produce information, access information, and share information. In some cases, users can use their computing devices to produce information which can be represented by machine-readable codes, such as Quick Response (QR) codes. In some instances, users can use their computing devices to read or scan machine-readable codes in order to access information. Furthermore, in some cases, users can share information using machine-readable codes, which can be provided by computing devices.

Under conventional approaches, providing machine-readable codes is performed separately and independently from scanning or reading machine-readable codes. In some cases, a first computing device (or system) can display a machine-readable code at a first time frame, and a second computing device can read the code at a second time frame subsequent to the first time frame. This approach can be inconvenient and inefficient.

In one example, a first user of a social networking system (or service) and a second user of the social networking system may desire to connect with one another. The first and second users may wish to connect with one another using machine-readable codes. The first user can have access to a first machine-readable code that represents his or her account with the social networking system, while the second user can have access to a second machine-readable code that represents his or her account with the social networking system. However, in some cases, when the first and second users attempt to connect using machine-readable codes, they may both display their respective codes, and thus one party has to open up a code reader tool instead. Moreover, in some cases, when attempting to connect, the first and second users may both open up code reader tools, and thus one party has provide his or her respective code instead. These and other concerns can add unnecessary obstacles for users to connect via the social networking system. As such, conventional approaches can create challenges for or reduce the overall user experience associated with utilizing machine-readable codes.

Therefore, an improved approach to utilizing machine-readable codes can be beneficial for addressing or alleviating various concerns associated with conventional approaches. Various embodiments of the present disclosure can acquire a first machine-readable code. The first machine-readable code can be provided on a display element. A reader tool for reading a second machine-readable code can be provided on the display element in conjunction with the providing of the first machine-readable code on the display element. In some embodiments, such display of the reader tool in conjunction with display of the first machine-readable code can include, for example, simultaneous display of the reader tool and the first machine-readable code. In some embodiments, such display of the reader tool in conjunction with display of the first machine-readable code also can include, for example, display of the reader tool and display of the first-machine readable code that coincide with each other for a duration of time even if they are not displayed simultaneously at all times. For example, display of the reader tool in conjunction with display of the first machine-readable code may involve display of the reader tool before the first machine-readable code is also displayed or display of the first machine-readable code before the reader tool is also displayed.

FIG. 1 illustrates an example system 100 associated with simultaneously providing and reading machine-readable codes, according to an embodiment of the present disclosure. The example system 100 can include an example client computing system (or device) 110 and an example server computing system (or device) 120. The example system 100 can also include at least one data store 130.

In the example of FIG. 1, the client computing system 110 can be configured to request 112 a first machine-readable code. In some cases, the client computing system 110 can transmit information to be represented or incorporated, at least in part, by the first machine-code. The information can, for example, be transmitted in or with the request 112. In some instances, the client computing system 110 can transmit a link, a message, an instruction, and/or text, etc., to the server computing system 120. The server computing system 120 can generate the first machine-readable code based on the information. The server computing system 120 can, for example, generate the first machine-readable code such that the code includes, incorporates, stores, or represents the information. As shown, the generated first machine-readable code can be transmitted 114 from the server computing system 120 to the client computing system 110 in response to the request 112. In this example, the client computing system 110 can provide (e.g., present, render, display, etc.) the first machine-readable code.

Moreover, in some implementations, the client computing system 110 can be configured to read and process a second machine-readable code. Subsequent to reading or scanning the second machine-readable code, the client computing system 110 can transmit 116 the second machine-readable code to the server computing system 120, as shown in the example of FIG. 1. The server computing system 120 can analyze the second machine-readable code in order to determine or retrieve information included in or represented by the second machine readable-code. Having determined or retrieved the information represented by the second machine-readable code, the server computing system 120 can transmit 118 the information to the client computing system 110. In this example, the client computing system 110 can perform one or more operations based on the information represented by the second machine-readable code.

Furthermore, the at least one data store 130 can be configured to store and maintain various types of data. In some embodiments, the data store 130 can store information associated with a social networking system (or service), such as the social networking system 930 of FIG. 9. The information associated with the social networking system can include data about users, identifiers, profiles, social connections, social interactions, locations, maps, places, events, groups, posts, communications, media, content, resources, account settings, privacy settings, and various other types of data. In some implementations, the server computing system 120 can communicate and/or operate with the at least one data store 130. For example, the server computing system 120 can communicate or work in conjunction with the data store 130 to generate the first machine-readable code. In another example, the server computing system 120 can communicate or work in conjunction with the data store 130 to determine, retrieve, or acquire the information represented by the second machine-readable code.

Figure 2:
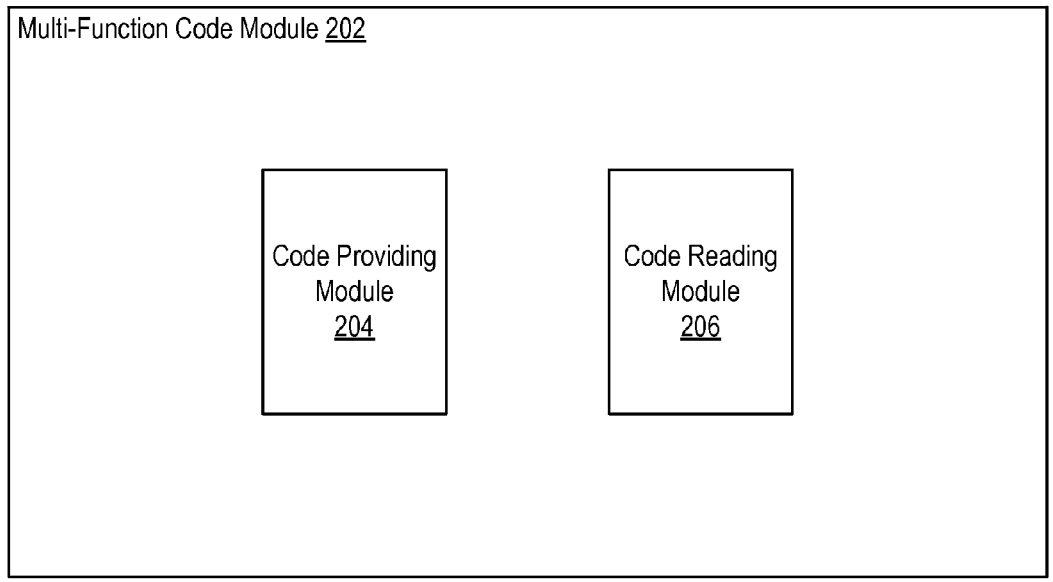
FIG. 2 illustrates an example multi-function code module configured to facilitate simultaneously providing and reading machine-readable codes, according to an embodiment of the present disclosure.

FIG. 2 illustrates an example multi-function code module 202 configured to facilitate simultaneously providing and reading machine-readable codes, according to an embodiment of the present disclosure. In some embodiments, the example multi-function code module 202 can be implemented within and/or reside with the client computing system 110 of FIG. 1. As shown, the example multi-function code module 202 can include a code providing module 204 and a code reading module 206.

The code providing module 204 can be configured to provide (e.g., produce, generate, render, display, present, etc.) one or more machine-readable codes. In some cases, examples of machine-readable codes can include, but are not limited to, Quick Response (QR) codes, barcodes, and tags. It is understood that there can be other possibilities. The code providing module 204 will be discussed in more detail below with reference to FIG. 3.

Moreover, the code reading module 206 can facilitate reading or scanning one or more machine-readable codes. In some embodiments, the code reading module 206 can include a code reader or scanner tool configured to read or scan machine-readable codes. In some embodiments, the code reader or scanner tool can be separate from or outside of the code reading module 206, but the code reading module 206 can still utilize or operate in conjunction with the code reader or scanner tool to read or scan machine-readable codes. More details relating to the code reading module 206 will be provided below with reference to FIG. 4.

In some implementations, the multi-function code module 202 can utilize the code providing module 204 to provide a first machine-readable code and can utilize the code reading module 206 to provide the code reader tool, which is capable of reading or scanning at least a second machine-readable code. The multi-function code module 202 can cause the first machine-readable code and the code reader tool to be provided in conjunction (e.g., simultaneously). In one example, the multi-function code module 202 can instruct the code providing module 204 to initiate a rendering or display of the first machine-readable code and to maintain the rendering or display. The multi-function code module 202 can further instruct the code reading module 206 to initiate and maintain the code reader tool configured to read at least the second machine-readable code when appropriate. In another example, the multi-function code module 202 can instruct the code reading module 206 to initiate and run the code reader tool and then instruct the code providing module 204 to initiate and maintain the providing of the first machine-readable code. In a further example, the multi-function code module 202 can instruct, in parallel, the code providing module 204 to provide the first machine-readable code and the code reading module 206 to initiate and run the code reader tool. It is understood that many variations are possible.

Figure 3:
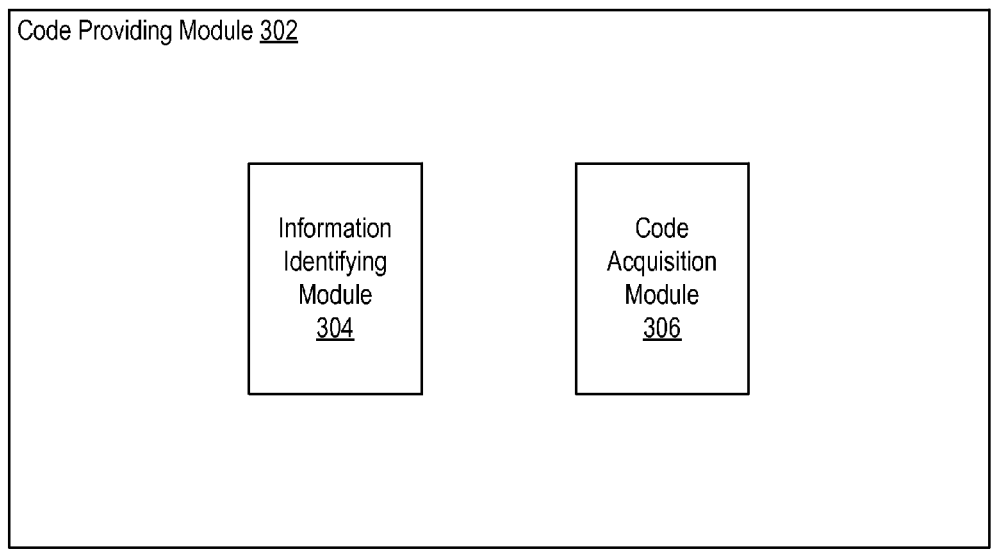
FIG. 3 illustrates an example code providing module configured to facilitate simultaneously providing and reading machine-readable codes, according to an embodiment of the present disclosure.

FIG. 3 illustrates an example code providing module 302 configured to facilitate simultaneously providing and reading machine-readable codes, according to an embodiment of the present disclosure. In some embodiments, the code providing module 204 of FIG. 2 can be implemented as the example code providing module 302. As shown, the example code providing module 302 can include an information identifying module 304 and a code acquisition module 306.

The information identifying module 304 can be configured to identify information that is to be included in, incorporated by, and/or represented by a machine-readable code. In some instances, the information identifying module 304 can identify the information and provide the identified information to be used for generating the machine-readable code, such that the generated machine-readable code incorporates or represents, at least in part, the identified information.

In one example, a first user of a computing device (or system) may desire to share his or her profile, contact, identification, or other information with a second user through a social networking system (or service). If the name of first user is very common, it can be challenging for the second user to locate the first user's name in the social networking system. Also, names that audibly sound similar can have different spellings or writings such that the second user may not have the correct spelling or writing of the first user's name. Moreover, in some cases, names in different languages can be difficult to find in the social networking system. There can be various other challenges associated with searching for users by their names. Accordingly, in this example, the first user may desire to create a first machine-readable code, such as a first QR code, that incorporates or represents information associated with the first user. In this example, the information identifying module 304 can provide the information associated with the first user, such as a unique identifier for the first user within the social networking system, a link to a profile or timeline of the first user within the social networking system, and/or an instruction associated with friending or socially connecting with the first user via the social networking system, etc.

In some implementations, the information identified by the information identifying module 304 can be provided to the code acquisition module 306. The code acquisition module 306 can be configured to acquire machine-readable codes. Continuing with the previous example, the code acquisition module 306 can acquire the first QR code by generating or rendering the first QR code based on the identified information, such that the first QR code represents or incorporates the identified information.

In some embodiments, the information identified by the information identifying module 304 can be provided to one or more servers, such that the one or more servers can generate the first QR code. The code acquisition module 306 can then acquire, retrieve, or receive the first QR code, or data about how to render the first QR code, from the one or more servers. The code acquisition module 306 can acquire, for example, the first QR code in image format or image data indicating how to generate the first QR code.

The code providing module 302 can provide a machine-readable code acquired (e.g., produced, received, etc.) by the code acquisition module 306. Continuing with the previous example, the code providing module 302 can present or display the first QR code, which represents information associated with the first user, on a display screen of the first user's computing device.

As discussed, various embodiments of the present disclosure can facilitate simultaneously providing and reading machine-readable codes. Continuing with the previous example, the second user may have a second QR code that represents information associated with the second user, such as a unique identifier for the second user within the social networking system. If the first user and the second user attempt to socially connect using their QR codes, then each user may not know whether to display his or her respective QR code or to open up a code reader tool. As such, in this example, the first QR code can be provided on the display screen of the first user's computing device in conjunction (e.g., simultaneously, at least temporarily at the same time, etc.) with the providing of a first code reader tool capable of reading the second QR code. Similarly, the second QR code can be provided on a display screen of the second user's computing device in conjunction with the providing of a second code reader tool for reading the first QR code. This approach utilizes QR codes more conveniently and efficiently.

Figure 4:
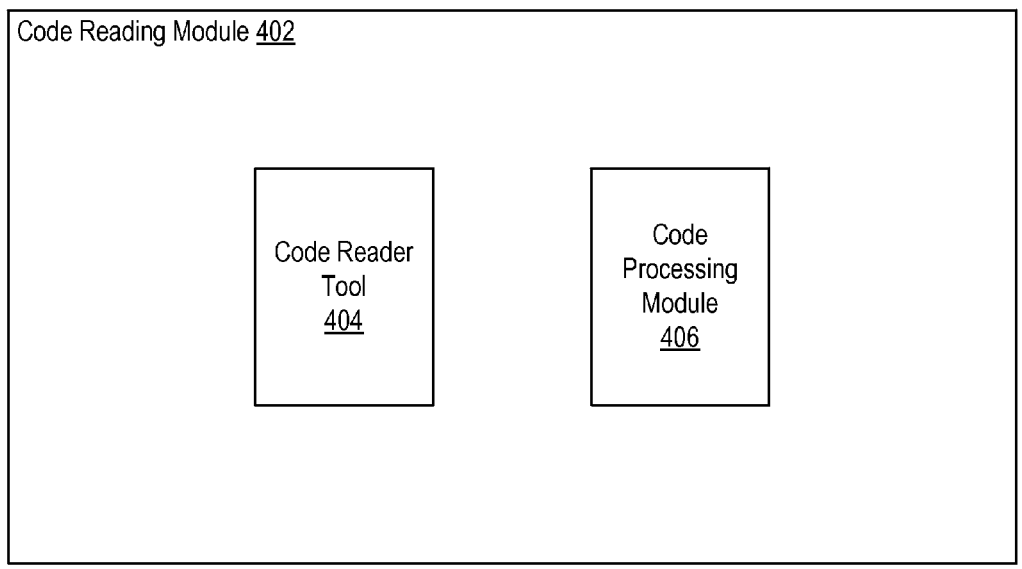
FIG. 4 illustrates an example code reading module configured to facilitate simultaneously providing and reading machine-readable codes, according to an embodiment of the present disclosure.

FIG. 4 illustrates an example code reading module 402 configured to facilitate simultaneously providing and reading machine-readable codes, according to an embodiment of the present disclosure. In some embodiments, the code reading module 206 of FIG. 2 can be implemented as the example code reading module 402. As shown, in some instances, the example code reading module 402 can include a code reader tool 404 and a code processing module 406.

The code reading module 402 can be configured to read machine-readable codes. In some embodiments, the code reading module 402 can use the code reader tool 404 to read the codes. As shown in the example of FIG. 2, in some embodiments, the code reading module 402 can include the code reader tool 404. In some implementations, however, the code reader tool can be separate from or outside of the code reading module 402. Furthermore, in some instances, the code reader tool can include, but is not limited to, a Quick Response (QR) code scanner tool, a barcode reader tool, a tag reader tool, etc., or any combination thereof. The code reader tool can, for example, utilize a device or system camera to read or scan machine-readable codes.

Furthermore, the code processing module 406 can be configured to process a machine-readable code to access information represented by the machine-readable code. In some embodiments, subsequent to processing the machine-readable code, the code reading module 402 can perform one or more operations based on the information represented by the machine-readable code.

In one example, a first user associated with a first QR code can read a second QR code associated with a second user. In this example, the first and second users are attempting to connect with each other in a social networking system using their respective QR codes. As such, the performing of the one or more operations based on the information represented by the second QR code can include connecting (e.g., friending) the first user and the second user in the social networking system, requesting to connect the first user and the second user in the social networking system, and/or accessing a page (e.g., profile, timeline, website, etc.) associated with the second user.

In some implementations, the code processing module 406 can process the machine-readable code by transmitting the machine-readable code to one or more servers and receiving, from the one or more servers, the information represented by the machine-readable code. It is also contemplated that many variations are possible. For example, in some implementations, the code processing module 406 can independently process the machine-readable code to access the information represented by the code. In this example, the information represented by the machine-readable code can be determined, recognized, deciphered, etc., by the code processing module 406 without transmitting the machine-readable code to the one or more servers.

Figure 5:
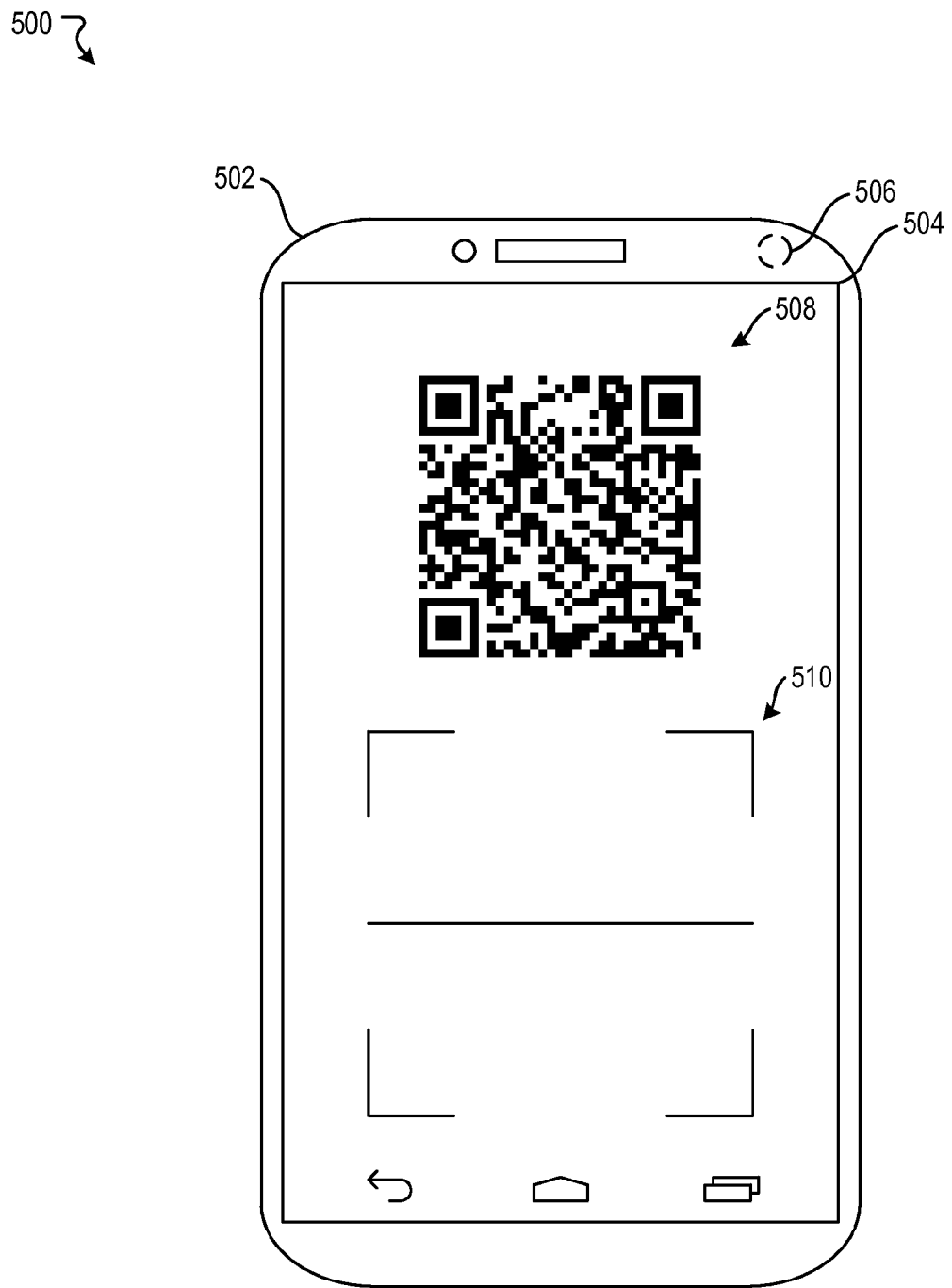
FIG. 5 illustrates an example scenario associated with simultaneously providing and reading machine-readable codes, according to an embodiment of the present disclosure.

FIG. 5 illustrates an example scenario 500 associated with simultaneously providing and reading machine-readable codes, according to an embodiment of the present disclosure. The example scenario 500 illustrates an example computing device or system 502 with a display element 504 and at least one camera 506.

As shown in the example scenario 500, the computing system 502 can be configured to provide, on the display element 504, a machine-readable code 508 in conjunction with a code reader tool 510. As discussed, the code reader tool 510 can utilize or operate with the camera 506 to read codes. Moreover, the providing of the machine-readable code 508 in conjunction with the code reader tool 510 can be maintained temporarily, for a specified duration, or until an action occurs to stop the providing of the machine-readable code 508 and the code reader tool 510. In some cases, the action can include, for example, a reading of the machine-readable code 508 by another code reader tool, a reading of another machine-readable code by the code reader tool 510, a system instruction, and/or a user command, etc. There can be many other possibilities and variations.

In some embodiments, the providing of the reader tool 510 in conjunction with the providing of the machine-readable code 508 can be performed subsequent to an user interaction with a search tool provided by the computing system 502. For example, a user can be interacting with a social networking application running on the computing system 502. When the user accesses a search tool provided by the application, there can be an option for the user to initiate a QR mode, resulting in the QR code 508 and QR reader tool 510 being provided in conjunction with one another.

In some embodiments, the providing of the reader tool 510 in conjunction with the providing of the machine-readable code 508 can be performed subsequent to detecting a swipe gesture from an edge of the display element 504. For example, a user can be using a social networking application running on the computing system 502. When the user swipes left from the right edge of the display element 504, which is displaying an interface of the social networking application, a QR mode can be initiated such that the QR code 508 and QR reader tool 510 are provided in conjunction. Again, many variations are possible.

Figure 6:
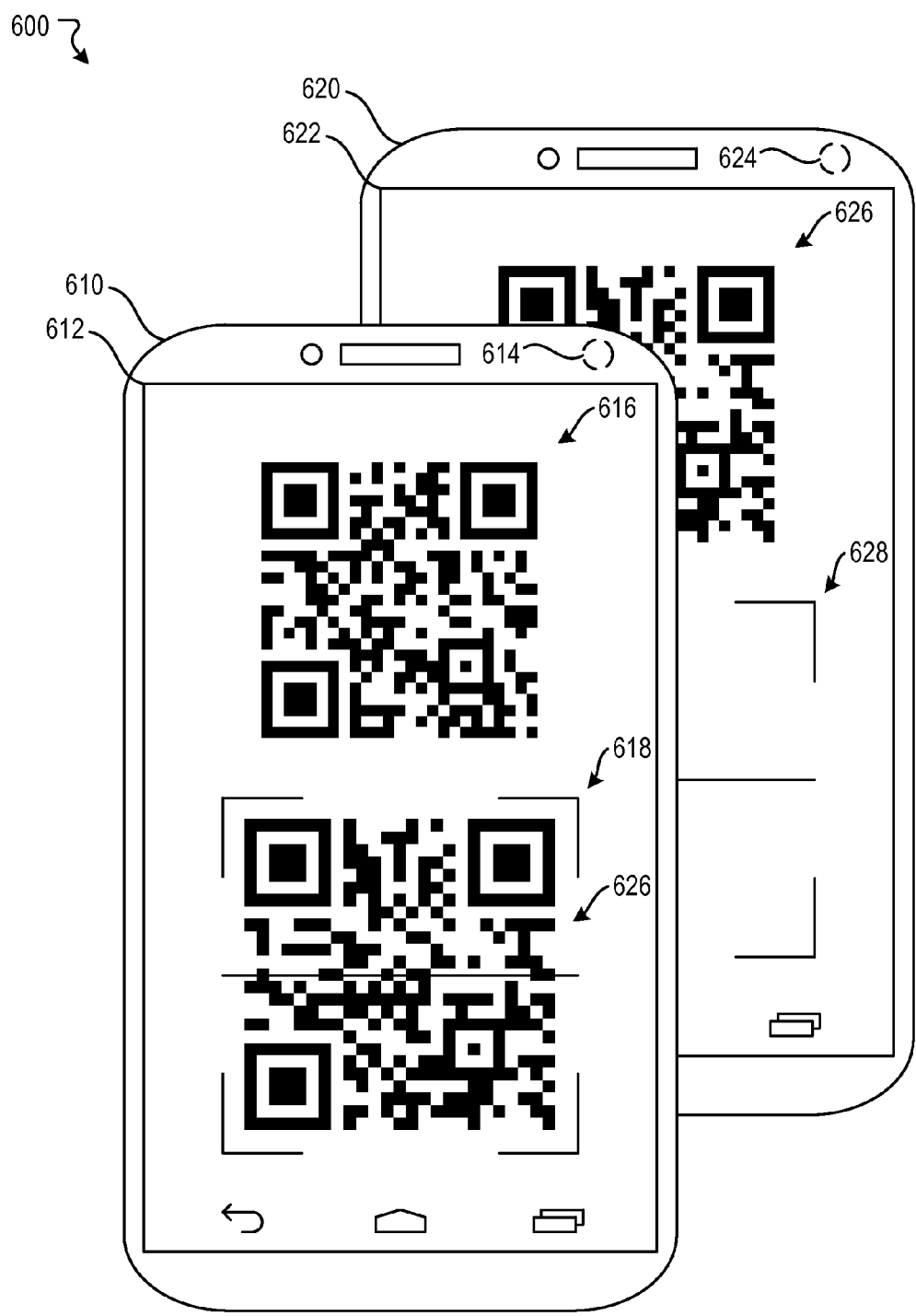
FIG. 6 illustrates an example scenario associated with simultaneously providing and reading machine-readable codes, according to an embodiment of the present disclosure.

FIG. 6 illustrates an example scenario 600 associated with simultaneously providing and reading machine-readable codes, according to an embodiment of the present disclosure. The example scenario 600 includes a first computing device or system 610 and a second computing device or system 620. In the example scenario 600, the first computing system 610 can include a first display element 612 and a first camera 614, while the second computing system 620 can include a second display element 622 and a second camera 624.

The first computing system 610 can provide a first machine-readable code 616 on the first display element 612 in conjunction with a first code reader tool 618 that utilizes the first camera 614 to read codes. The second computing system 620 can provide a second machine-readable code 626 on the second display element 622 in conjunction with a second code reader tool 628 that utilizes the second camera 624 to read codes.

In the example scenario 600, the second machine-readable code 626 can be read by the first code reader tool 618 based on an act of placing a rear surface of the first computing system 610, which exposes the first camera 614 of the first computing system 610, at least partially on top of a front surface of the second computing system 620, which exposes the second display element 622. Although not explicitly illustrated in the example scenario 600, the first machine-readable code 616 can similarly be read by the second code reader tool 628 based on an act of placing a rear surface of the second computing system 620, which exposes the second camera 624, at least partially on top of a front surface of the first computing system 610, which exposes the first display element 612. In some cases, one computing system can be placed directly on top of the other computing system and in alignment with the other computing system to cause the code reading to occur.

Figure 7:
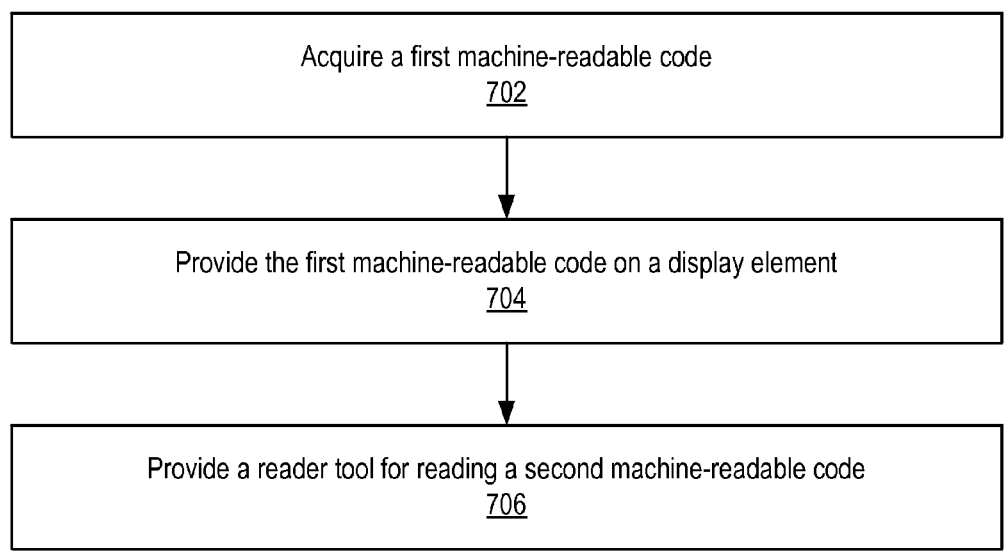
FIG. 7 illustrates an example method associated with simultaneously providing and reading machine-readable codes, according to an embodiment of the present disclosure.

FIG. 7 illustrates an example method 700 associated with simultaneously providing and reading machine-readable codes, according to an embodiment of the present disclosure. It should be appreciated that there can be additional, fewer, or alternative steps performed in similar or alternative orders, or in parallel, within the scope of the various embodiments unless otherwise stated.

At block 702, the example method 700 can acquire a first machine-readable code. At block 704, the example method 700 can provide the first machine-readable code on a display element. At block 706, the example method 700 can provide a reader tool for reading a second machine-readable code. The reader tool can be provided on the display element in conjunction with the providing of the first machine-readable code.

Figure 8:
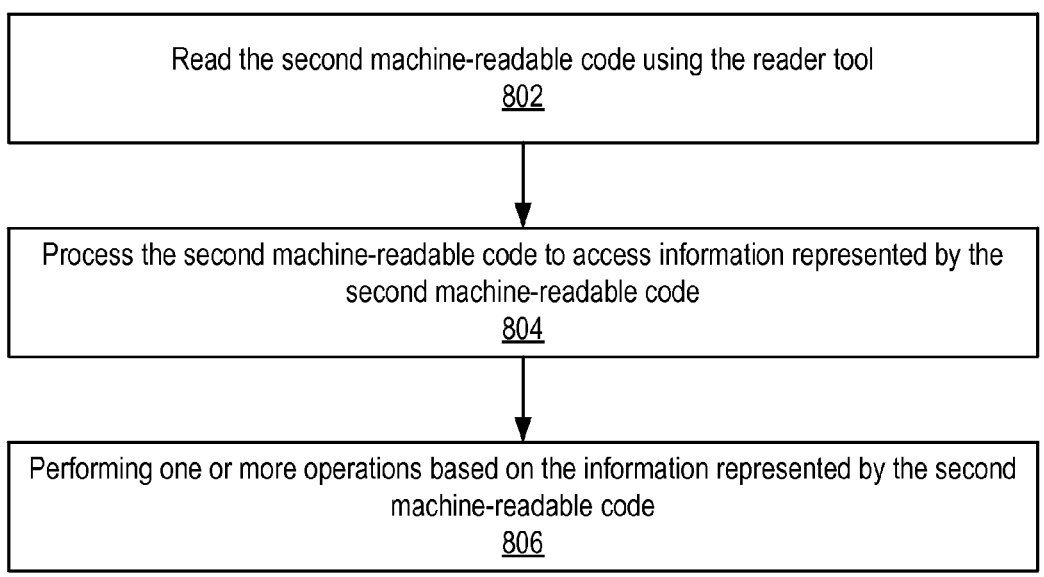
FIG. 8 illustrates an example method associated with simultaneously providing and reading machine-readable codes, according to an embodiment of the present disclosure.

FIG. 8 illustrates an example method 800 associated with simultaneously providing and reading machine-readable codes, according to an embodiment of the present disclosure. Again, it should be appreciated that there can be additional, fewer, or alternative steps performed in similar or alternative orders, or in parallel, within the scope of the various embodiments unless otherwise stated.

At block 802, the example method 800 can read the second machine-readable code using the reader tool. At block 804, the example method 800 can process the second machine-readable code to access information represented by the second machine-readable code. At block 806, the example method 800 can perform one or more operations based on the information represented by the second machine-readable code.

As discussed throughout, many variations are possible. For example, in some embodiments, the information represented by the second machine-readable code can be associated with a unique identifier for a group within a social networking system. The performing of the one or more operations based on the information represented by the second machine-readable code can include accessing the group within the social networking system, receiving an invitation to join the group, requesting to join the group, and/or transmitting a response to join the group.

In some embodiments, the information represented by the second machine-readable code can be associated with a unique identifier for an event within a social networking system. The performing of the one or more operations can include accessing the event within the social networking system, receiving an invitation to the event, requesting to be invited to the event, and/or transmitting a response indicating attendance for the event.

In some embodiments, the information represented by the second machine-readable code can be associated with a unique identifier for a page within a social networking system. The performing of the one or more operations can include accessing the page within the social networking system, supporting the page within the social networking system, and/or sharing the page within the social networking system.

In some embodiments, the information represented by the second machine-readable code can be associated with a unique identifier for a content item within a social networking system. The performing of the one or more operations can include accessing the content item, storing the content item, supporting the content item within the social networking system, and/or sharing the content item within the social networking system.

In some embodiments, the information represented by the second machine-readable code can be associated with a unique identifier for an online resource. The performing of the one or more operations can include accessing the online resource.

Moreover, in some embodiments, the first machine-readable code and/or the second machine-readable code can expire based on at least one of a system setting or a user setting.

Again, it is contemplated that there can be many other uses, applications, and/or variations associated with the various embodiments of the present disclosure. For example, various embodiments of the present disclosure can learn, improve, and/or be refined over time.

Social Networking System—Example Implementation

Figure 9:
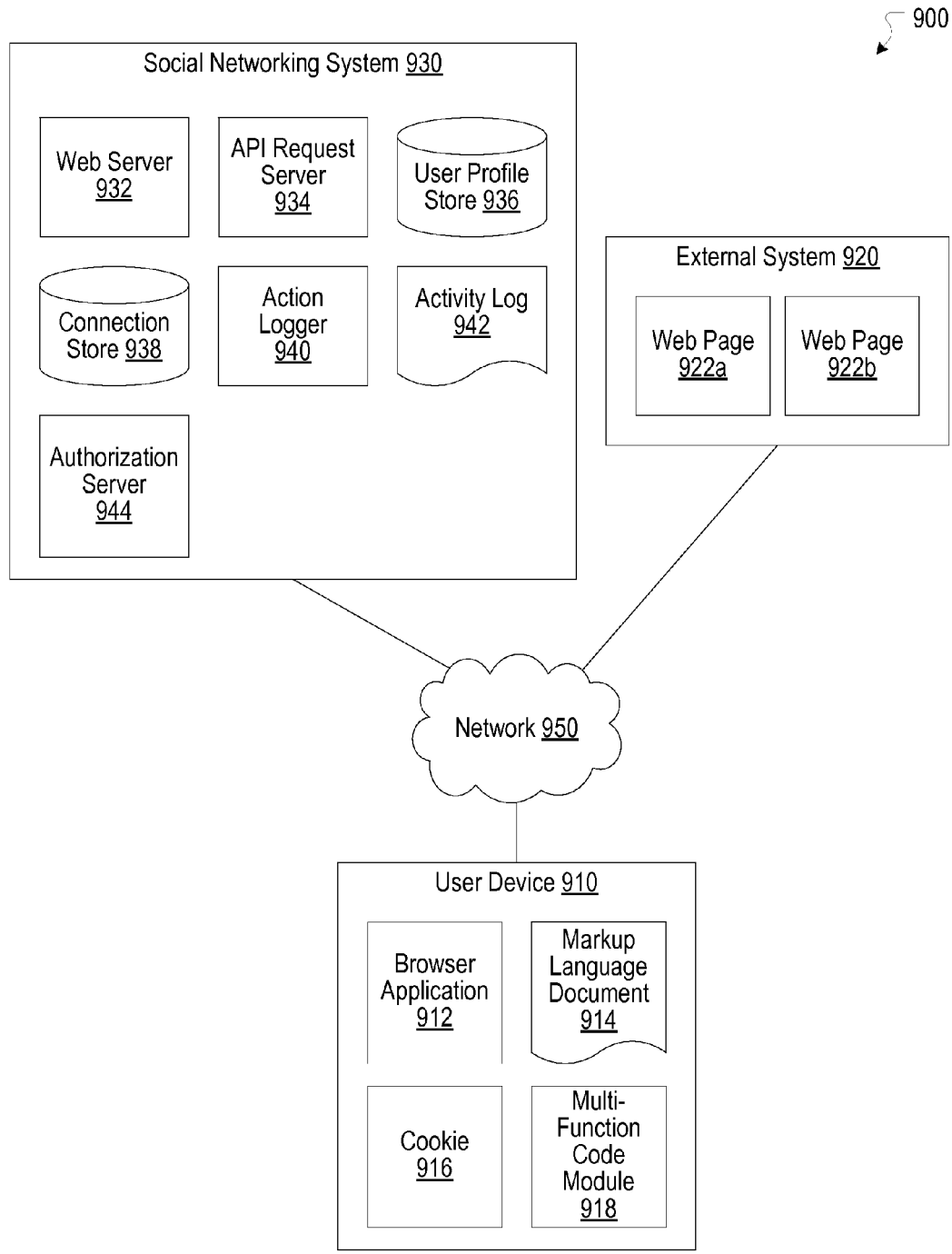
FIG. 9 illustrates a network diagram of an example system that can be utilized in various scenarios, according to an embodiment of the present disclosure.

FIG. 9 illustrates a network diagram of an example system 900 that can be utilized in various scenarios, in accordance with an embodiment of the present disclosure. The system 900 includes one or more user devices 910, one or more external systems 920, a social networking system (or service) 930, and a network 950. In an embodiment, the social networking service, provider, and/or system discussed in connection with the embodiments described above may be implemented as the social networking system 930. For purposes of illustration, the embodiment of the system 900, shown by FIG. 9, includes a single external system 920 and a single user device 910. However, in other embodiments, the system 900 may include more user devices 910 and/or more external systems 920. In certain embodiments, the social networking system 930 is operated by a social network provider, whereas the external systems 920 are separate from the social networking system 930 in that they may be operated by different entities. In various embodiments, however, the social networking system 930 and the external systems 920 operate in conjunction to provide social networking services to users (or members) of the social networking system 930. In this sense, the social networking system 930 provides a platform or backbone, which other systems, such as external systems 920, may use to provide social networking services and functionalities to users across the Internet.

The user device 910 comprises one or more computing devices that can receive input from a user and transmit and receive data via the network 950. In one embodiment, the user device 910 is a conventional computer system executing, for example, a Microsoft Windows compatible operating system (OS), Apple OS X, and/or a Linux distribution. In another embodiment, the user device 910 can be a device having computer functionality, such as a smart-phone, a tablet, a personal digital assistant (PDA), a mobile telephone, etc. The user device 910 is configured to communicate via the network 950. The user device 910 can execute an application, for example, a browser application that allows a user of the user device 910 to interact with the social networking system 930. In another embodiment, the user device 910 interacts with the social networking system 930 through an application programming interface (API) provided by the native operating system of the user device 910, such as iOS and ANDROID. The user device 910 is configured to communicate with the external system 920 and the social networking system 930 via the network 950, which may comprise any combination of local area and/or wide area networks, using wired and/or wireless communication systems.

In one embodiment, the network 950 uses standard communications technologies and protocols. Thus, the network 950 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 950 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 950 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 910 may display content from the external system 920 and/or from the social networking system 930 by processing a markup language document 914 received from the external system 920 and from the social networking system 930 using a browser application 912. The markup language document 914 identifies content and one or more instructions describing formatting or presentation of the content. By executing the instructions included in the markup language document 914, the browser application 912 displays the identified content using the format or presentation described by the markup language document 914. For example, the markup language document 914 includes instructions for generating and displaying a web page having multiple frames that include text and/or image data retrieved from the external system 920 and the social networking system 930. In various embodiments, the markup language document 914 comprises a data file including extensible markup language (XML) data, extensible hypertext markup language (XHTML) data, or other markup language data. Additionally, the markup language document 914 may include JavaScript Object Notation (JSON) data, JSON with padding (JSONP), and JavaScript data to facilitate data-interchange between the external system 920 and the user device 910. The browser application 912 on the user device 910 may use a JavaScript compiler to decode the markup language document 914.

The markup language document 914 may also include, or link to, applications or application frameworks such as FLASH™ or Unity™ applications, the SilverLight™ application framework, etc.

In one embodiment, the user device 910 also includes one or more cookies 916 including data indicating whether a user of the user device 910 is logged into the social networking system 930, which may enable modification of the data communicated from the social networking system 930 to the user device 910.

The external system 920 includes one or more web servers that include one or more web pages 922a, 922b, which are communicated to the user device 910 using the network 950. The external system 920 is separate from the social networking system 930. For example, the external system 920 is associated with a first domain, while the social networking system 930 is associated with a separate social networking domain. Web pages 922a, 922b, included in the external system 920, comprise markup language documents 914 identifying content and including instructions specifying formatting or presentation of the identified content.

The social networking system 930 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 930 may be administered, managed, or controlled by an operator. The operator of the social networking system 930 may be a human being, an automated application, or a series of applications for managing content, regulating policies, and collecting usage metrics within the social networking system 930. Any type of operator may be used.

Users may join the social networking system 930 and then add connections to any number of other users of the social networking system 930 to whom they desire to be connected. As used herein, the term "friend" refers to any other user of the social networking system 930 to whom a user has formed a connection, association, or relationship via the social networking system 930. For example, in an embodiment, if users in the social networking system 930 are represented as nodes in the social graph, the term "friend" can refer to an edge formed between and directly connecting two user nodes.

Connections may be added explicitly by a user or may be automatically created by the social networking system 930 based on common characteristics of the users (e.g., users who are alumni of the same educational institution). For example, a first user specifically selects a particular other user to be a friend. Connections in the social networking system 930 are usually in both directions, but need not be, so the terms "user" and "friend" depend on the frame of reference. Connections between users of the social networking system 930 are usually bilateral ("two-way"), or "mutual," but connections may also be unilateral, or "one-way." For example, if Bob and Joe are both users of the social networking system 930 and connected to each other, Bob and Joe are each other's connections. If, on the other hand, Bob wishes to connect to Joe to view data communicated to the social networking system 930 by Joe, but Joe does not wish to form a mutual connection, a unilateral connection may be established. The connection between users may be a direct connection; however, some embodiments of the social networking system 930 allow the connection to be indirect via one or more levels of connections or degrees of separation.

In addition to establishing and maintaining connections between users and allowing interactions between users, the social networking system 930 provides users with the ability to take actions on various types of items supported by the social networking system 930. These items may include groups or networks (i.e., social networks of people, entities, and concepts) to which users of the social networking system 930 may belong, events or calendar entries in which a user might be interested, computer-based applications that a user may use via the social networking system 930, transactions that allow users to buy or sell items via services provided by or through the social networking system 930, and interactions with advertisements that a user may perform on or off the social networking system 930. These are just a few examples of the items upon which a user may act on the social networking system 930, and many others are possible. A user may interact with anything that is capable of being represented in the social networking system 930 or in the external system 920, separate from the social networking system 930, or coupled to the social networking system 930 via the network 950.

The social networking system 930 is also capable of linking a variety of entities. For example, the social networking system 930 enables users to interact with each other as well as external systems 920 or other entities through an API, a web service, or other communication channels. The social networking system 930 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 930. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 930 modifies edges connecting the various nodes to reflect the relationships and interactions.

The social networking system 930 also includes user-generated content, which enhances a user's interactions with the social networking system 930. User-generated content may include anything a user can add, upload, send, or "post" to the social networking system 930. For example, a user communicates posts to the social networking system 930 from a user device 910. Posts may include data such as status updates or other textual data, location information, images such as photos, videos, links, music or other similar data and/or media. Content may also be added to the social networking system 930 by a third party. Content "items" are represented as objects in the social networking system 930. In this way, users of the social networking system 930 are encouraged to communicate with each other by posting text and content items of various types of media through various communication channels. Such communication increases the interaction of users with each other and increases the frequency with which users interact with the social networking system 930.

The social networking system 930 includes a web server 932, an API request server 934, a user profile store 936, a connection store 938, an action logger 940, an activity log 942, and an authorization server 944. In an embodiment of the invention, the social networking system 930 may include additional, fewer, or different components for various applications. Other components, such as network interfaces, security mechanisms, load balancers, failover servers, management and network operations consoles, and the like are not shown so as to not obscure the details of the system.

The user profile store 936 maintains information about user accounts, including biographic, demographic, and other types of descriptive information, such as work experience, educational history, hobbies or preferences, location, and the like that has been declared by users or inferred by the social networking system 930. This information is stored in the user profile store 936 such that each user is uniquely identified. The social networking system 930 also stores data describing one or more connections between different users in the connection store 938. The connection information may indicate users who have similar or common work experience, group memberships, hobbies, or educational history. Additionally, the social networking system 930 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 930, such as non-person entities, buckets, cluster centers, images, interests, pages, external systems, concepts, and the like are also stored in the connection store 938.

The social networking system 930 maintains data about objects with which a user may interact. To maintain this data, the user profile store 936 and the connection store 938 store instances of the corresponding type of objects maintained by the social networking system 930. Each object type has information fields that are suitable for storing information appropriate to the type of object. For example, the user profile store 936 contains data structures with fields suitable for describing a user's account and information related to a user's account. When a new object of a particular type is created, the social networking system 930 initializes a new data structure of the corresponding type, assigns a unique object identifier to it, and begins to add data to the object as needed. This might occur, for example, when a user becomes a user of the social networking system 930, the social networking system 930 generates a new instance of a user profile in the user profile store 936, assigns a unique identifier to the user account, and begins to populate the fields of the user account with information provided by the user.

The connection store 938 includes data structures suitable for describing a user's connections to other users, connections to external systems 920 or connections to other entities. The connection store 938 may also associate a connection type with a user's connections, which may be used in conjunction with the user's privacy setting to regulate access to information about the user. In an embodiment of the invention, the user profile store 936 and the connection store 938 may be implemented as a federated database.

Data stored in the connection store 938, the user profile store 936, and the activity log 942 enables the social networking system 930 to generate the social graph that uses nodes to identify various objects and edges connecting nodes to identify relationships between different objects. For example, if a first user establishes a connection with a second user in the social networking system 930, user accounts of the first user and the second user from the user profile store 936 may act as nodes in the social graph. The connection between the first user and the second user stored by the connection store 938 is an edge between the nodes associated with the first user and the second user. Continuing this example, the second user may then send the first user a message within the social networking system 930. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 930 (or, alternatively, in an image maintained by another system outside of the social networking system 930). The image may itself be represented as a node in the social networking system 930. This tagging action may create edges between the first user and the second user as well as create an edge between each of the users and the image, which is also a node in the social graph. In yet another example, if a user confirms attending an event, the user and the event are nodes obtained from the user profile store 936, where the attendance of the event is an edge between the nodes that may be retrieved from the activity log 942. By generating and maintaining the social graph, the social networking system 930 includes data describing many different types of objects and the interactions and connections among those objects, providing a rich source of socially relevant information.

The web server 932 links the social networking system 930 to one or more user devices 910 and/or one or more external systems 920 via the network 950. The web server 932 serves web pages, as well as other web-related content, such as Java, JavaScript, Flash, XML, and so forth. The web server 932 may include a mail server or other messaging functionality for receiving and routing messages between the social networking system 930 and one or more user devices 910. The messages can be instant messages, queued messages (e.g., email), text and SMS messages, or any other suitable messaging format.

The API request server 934 allows one or more external systems 920 and user devices 910 to call access information from the social networking system 930 by calling one or more API functions. The API request server 934 may also allow external systems 920 to send information to the social networking system 930 by calling APIs. The external system 920, in one embodiment, sends an API request to the social networking system 930 via the network 950, and the API request server 934 receives the API request. The API request server 934 processes the request by calling an API associated with the API request to generate an appropriate response, which the API request server 934 communicates to the external system 920 via the network 950. For example, responsive to an API request, the API request server 934 collects data associated with a user, such as the user's connections that have logged into the external system 920, and communicates the collected data to the external system 920. In another embodiment, the user device 910 communicates with the social networking system 930 via APIs in the same manner as external systems 920.

The action logger 940 is capable of receiving communications from the web server 932 about user actions on and/or off the social networking system 930. The action logger 940 populates the activity log 942 with information about user actions, enabling the social networking system 930 to discover various actions taken by its users within the social networking system 930 and outside of the social networking system 930. Any action that a particular user takes with respect to another node on the social networking system 930 may be associated with each user's account, through information maintained in the activity log 942 or in a similar database or other data repository. Examples of actions taken by a user within the social networking system 930 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 930, the action is recorded in the activity log 942. In one embodiment, the social networking system 930 maintains the activity log 942 as a database of entries. When an action is taken within the social networking system 930, an entry for the action is added to the activity log 942. The activity log 942 may be referred to as an action log.

Additionally, user actions may be associated with concepts and actions that occur within an entity outside of the social networking system 930, such as an external system 920 that is separate from the social networking system 930. For example, the action logger 940 may receive data describing a user's interaction with an external system 920 from the web server 932. In this example, the external system 920 reports a user's interaction according to structured actions and objects in the social graph.

Other examples of actions where a user interacts with an external system 920 include a user expressing an interest in an external system 920 or another entity, a user posting a comment to the social networking system 930 that discusses an external system 920 or a web page 922a within the external system 920, a user posting to the social networking system 930 a Uniform Resource Locator (URL) or other identifier associated with an external system 920, a user attending an event associated with an external system 920, or any other action by a user that is related to an external system 920. Thus, the activity log 942 may include actions describing interactions between a user of the social networking system 930 and an external system 920 that is separate from the social networking system 930.

The authorization server 944 enforces one or more privacy settings of the users of the social networking system 930. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 920, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 920. One embodiment allows the specification of the set of entities to comprise an enumeration of entities. For example, the user may provide a list of external systems 920 that are allowed to access certain information. Another embodiment allows the specification to comprise a set of entities along with exceptions that are not allowed to access the information. For example, a user may allow all external systems 920 to access the user's work information, but specify a list of external systems 920 that are not allowed to access the work information. Certain embodiments call the list of exceptions that are not allowed to access certain information a "block list". External systems 920 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 944 contains logic to determine if certain information associated with a user can be accessed by a user's friends, external systems 920, and/or other applications and entities. The external system 920 may need authorization from the authorization server 944 to access the user's more private and sensitive information, such as the user's work phone number. Based on the user's privacy settings, the authorization server 944 determines if another user, the external system 920, an application, or another entity is allowed to access information associated with the user, including information about actions taken by the user.

In some embodiments, the user device 910 can include a multi-function code module 918. In some cases, the user device 910 can be implemented as the client computing system 110 of FIG. 1 and the multi-function code module 918 can be implemented as the multi-function code module 202 of FIG. 2. In some instances, one or more servers such as the server computing system 120 of FIG. 1 can be implemented within the social networking system 930. The multi-function code module 918 can be configured to facilitate acquiring a first machine-readable code. The multi-function code module 918 can also be configured to facilitate providing the first machine-readable code on a display element, such as a display screen of the user device 910. The multi-function code module 918 can further be configured to facilitate providing a reader tool for reading a second machine-readable code. Additionally, the multi-function code module 918 can be configured to facilitate providing the reader tool on the display element in conjunction with the providing of the first machine-readable code on the display element.

Hardware Implementation

Figure 10:
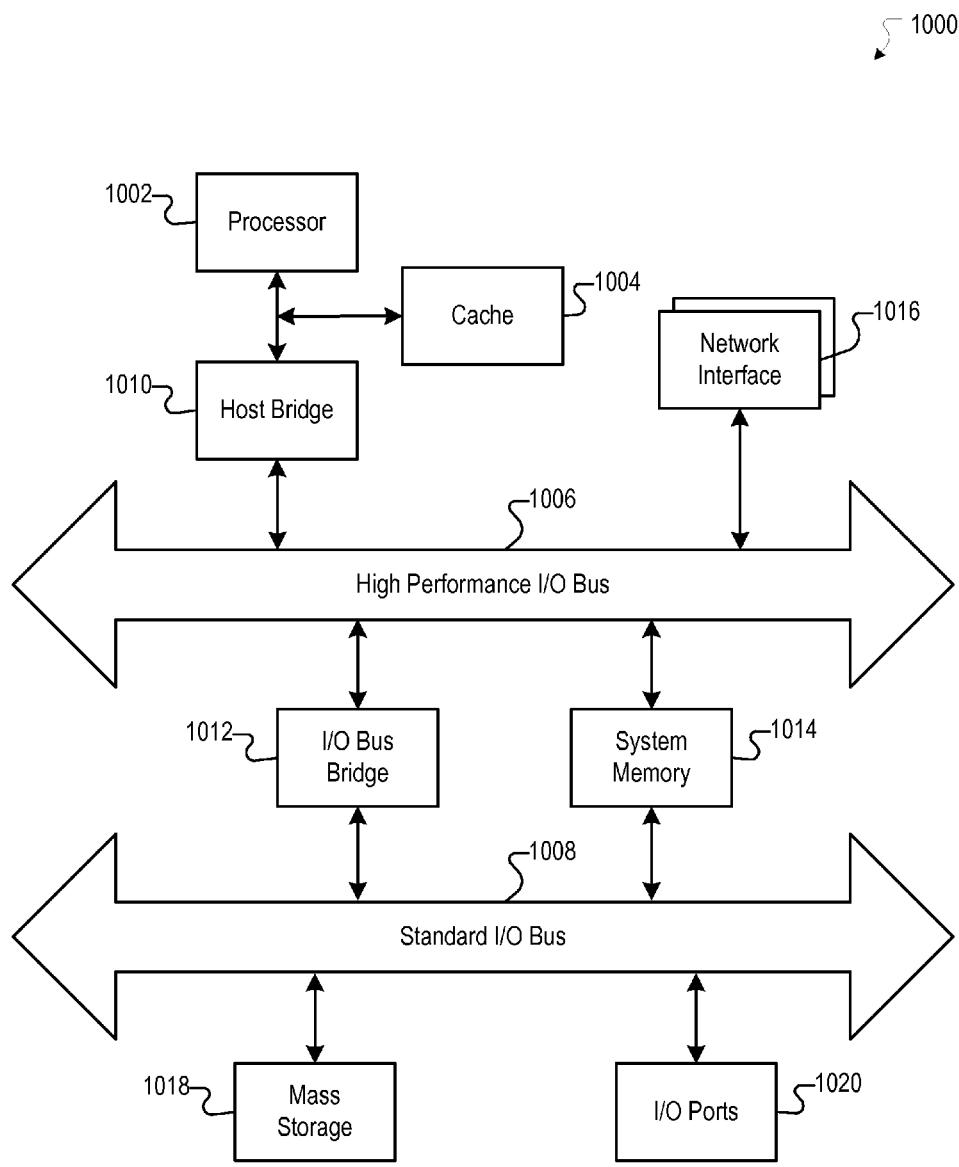
FIG. 10 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 10 illustrates an example of a computer system 1000 that may be used to implement one or more of the embodiments described herein in accordance with an embodiment of the invention. The computer system 1000 includes sets of instructions for causing the computer system 1000 to perform the processes and features discussed herein. The computer system 1000 may be connected (e.g., networked) to other machines. In a networked deployment, the computer system 1000 may operate in the capacity of a server machine or a client machine in a client-server network environment, or as a peer machine in a peer-to-peer (or distributed) network environment. In an embodiment of the invention, the computer system 1000 may be the social networking system 930, the user device 910, and the external system 1020, or a component thereof. In an embodiment of the invention, the computer system 1000 may be one server among many that constitutes all or part of the social networking system 930.

The computer system 1000 includes a processor 1002, a cache 1004, and one or more executable modules and drivers, stored on a computer-readable medium, directed to the processes and features described herein. Additionally, the computer system 1000 includes a high performance input/output (I/O) bus 1006 and a standard I/O bus 1008. A host bridge 1010 couples processor 1002 to high performance I/O bus 1006, whereas I/O bus bridge 1012 couples the two buses 1006 and 1008 to each other. A system memory 1014 and one or more network interfaces 1016 couple to high performance I/O bus 1006. The computer system 1000 may further include video memory and a display device coupled to the video memory (not shown). Mass storage 1018 and I/O ports 1020 couple to the standard I/O bus 1008. The computer system 1000 may optionally include a keyboard and pointing device, a display device, or other input/output devices (not shown) coupled to the standard I/O bus 1008. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 1000, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 1000 are described in greater detail below. In particular, the network interface 1016 provides communication between the computer system 1000 and any of a wide range of networks, such as an Ethernet (e.g., IEEE 802.3) network, a backplane, etc. The mass storage 1018 provides permanent storage for the data and programming instructions to perform the above-described processes and features implemented by the respective computing systems identified above, whereas the system memory 1014 (e.g., DRAM) provides temporary storage for the data and programming instructions when executed by the processor 1002. The I/O ports 1020 may be one or more serial and/or parallel communication ports that provide communication between additional peripheral devices, which may be coupled to the computer system 1000.

The computer system 1000 may include a variety of system architectures, and various components of the computer system 1000 may be rearranged. For example, the cache 1004 may be on-chip with processor 1002. Alternatively, the cache 1004 and the processor 1002 may be packed together as a "processor module", with processor 1002 being referred to as the "processor core". Furthermore, certain embodiments of the invention may neither require nor include all of the above components. For example, peripheral devices coupled to the standard I/O bus 1008 may couple to the high performance I/O bus 1006. In addition, in some embodiments, only a single bus may exist, with the components of the computer system 1000 being coupled to the single bus. Moreover, the computer system 1000 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 1000 that, when read and executed by one or more processors, cause the computer system 1000 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 1000, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 1002. Initially, the series of instructions may be stored on a storage device, such as the mass storage 1018. However, the series of instructions can be stored on any suitable computer readable storage medium. Furthermore, the series of instructions need not be stored locally, and could be received from a remote storage device, such as a server on a network, via the network interface 1016. The instructions are copied from the storage device, such as the mass storage 1018, into the system memory 1014 and then accessed and executed by the processor 1002. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 1000 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   acquiring, by a computing system, a first machine-readable code;
   providing, by the computing system, the first machine-readable code on a display element;
   providing, by the computing system, a reader tool for reading at least a second machine-readable code, the reader tool being provided on the display element in conjunction with the providing of the first machine-readable code on the display element such that the reader tool and the first machine-readable code are at least temporarily displayed on the display element at a same time,
   wherein the second machine-readable code and a second reader tool for reading at least the first machine-readable code are provided on a second display element of a second computing system; and
   initiating, by the computing system, a reading of the second machine-readable code using the reader tool while the first machine-readable code is provided on the display element at the same time and while a representation of the second machine-readable code is displayed on the display element to appear at least partially within the reader tool, wherein the reader tool being provided on the display element enables a user to align the representation of the second machine-readable code on the display element at least partially within the reader tool on the display element,
   wherein the providing the first machine-readable code on the display element and the providing the reader tool on the display element are stopped by completing the reading of the second machine-readable code using the reader tool.

2. The computer-implemented method of claim 1, further comprising:
   reading the second machine-readable code using the reader tool;
   processing the second machine-readable code to access information represented by the second machine-readable code; and
   performing one or more operations based on the information represented by the second machine-readable code.

3. The computer-implemented method of claim 2, wherein the reading of the second machine-readable code is performed based on placing a rear surface of the computing system which exposes a camera of the computing system at least partially on top of a front surface of the second computing system which exposes the second display element.

4. The computer-implemented method of claim 2, wherein the first machine-readable code represents, at least in part, information associated with a unique identifier for a first user of a social networking system, and wherein the information represented by the second machine-readable code is associated with a unique identifier for a second user of the social networking system.

5. The computer-implemented method of claim 4, wherein the performing of the one or more operations based on the information represented by the second machine-readable code includes at least one of connecting the first user and the second user in the social networking system, requesting to connect the first user and the second user in the social networking system, or accessing a page associated with the second user.

6. The computer-implemented method of claim 2, wherein the information represented by the second machine-readable code is associated with a unique identifier for a group within a social networking system, and wherein the performing of the one or more operations based on the information represented by the second machine-readable code includes at least one of accessing the group within the social networking system, receiving an invitation to join the group, requesting to join the group, or transmitting a response to join the group.

7. The computer-implemented method of claim 2, wherein the information represented by the second machine-readable code is associated with a unique identifier for an event within a social networking system, and wherein the performing of the one or more operations based on the information represented by the second machine-readable code includes at least one of accessing the event within the social networking system, receiving an invitation to the event, requesting to be invited to the event, or transmitting a response indicating attendance for the event.

8. The computer-implemented method of claim 2, wherein the information represented by the second machine-readable code is associated with a unique identifier for a page within a social networking system, and wherein the performing of the one or more operations based on the information represented by the second machine-readable code includes at least one of accessing the page within the social networking system, supporting the page within the social networking system, or sharing the page within the social networking system.

9. The computer-implemented method of claim 2, wherein the information represented by the second machine-readable code is associated with a unique identifier for a content item within a social networking system, and wherein the performing of the one or more operations based on the information represented by the second machine-readable code includes at least one of accessing the content item, storing the content item, supporting the content item within the social networking system, or sharing the content item within the social networking system.

10. The computer-implemented method of claim 2, wherein the information represented by the second machine-readable code is associated with a unique identifier for an online resource, and wherein the performing of the one or more operations based on the information represented by the second machine-readable code includes accessing the online resource.

11. The computer-implemented method of claim 1, wherein the first machine-readable code is different from the second-machine readable code, wherein the first machine-readable code includes at least one of a first Quick Response (QR) code, a first barcode, or a first machine-readable tag, and wherein the second machine-readable code includes at least one of a second Quick Response (QR) code, a second barcode, or a second machine-readable tag.

12. The computer-implemented method of claim 1, wherein the reader tool includes at least one of a Quick Response (QR) code scanner tool, a barcode reader tool, or a tag reader tool.

13. The computer-implemented method of claim 1, further comprising:
identifying, prior to the acquiring of the first machine-readable code, information to be represented by the first machine-readable code; and
transmitting, prior to the acquiring of the first machine-readable code, the information to one or more servers, wherein the first machine-readable code is generated by the one or more servers to represent, at least in part, the information.

14. The computer-implemented method of claim 1, wherein the acquiring of the first machine-readable code includes at least one of: 1) receiving the first machine-readable code in image format or 2) receiving image data associated with the first machine-readable code and generating the first machine-readable code based on the image data.

15. The computer-implemented method of claim 1, wherein the processing of the second machine-readable code to access the information represented by the second machine-readable code further comprises:
transmitting the second machine-readable code to one or more servers; and
receiving, from the one or more servers, the information represented by the second machine-readable code.

16. The computer-implemented method of claim 1, wherein at least one of the first machine-readable code or the second machine-readable code expires after a specified duration based on at least one of a system setting or a user setting.

17. The computer-implemented method of claim 1, wherein the providing of the reader tool in conjunction with the providing of the first machine-readable code is performed subsequent to a user interaction with a search tool provided by the computing system.

18. The computer-implemented method of claim 1, wherein the providing of the reader tool in conjunction with the providing of the first machine-readable code is performed subsequent to detecting a swipe gesture from an edge of the display element.

19. A system comprising:
at least one processor; and
a memory storing instructions that, when executed by the at least one processor, cause the system to perform:
acquiring a first machine-readable code;
providing the first machine-readable code on a display element;
providing a reader tool for reading at least a second machine-readable code, the reader tool being provided on the display element in conjunction with the providing of the first machine-readable code on the display element such that the reader tool and the first machine-readable code are at least temporarily displayed on the display element at a same time,
wherein the second machine-readable code and a second reader tool for reading at least the first machine-readable code are provided on a second display element of a second computing system; and
initiating a reading of the second machine-readable code using the reader tool while the first machine-readable code is provided on the display element at the same time and while a representation of the second machine-readable code is displayed on the display element to appear at least partially within the reader tool, wherein the reader tool being provided on the display element enables a user to align the representation of the second machine-readable code on the display element at least partially within the reader tool on the display element,
wherein the providing the first machine-readable code on the display element and the providing the reader tool on the display element are stopped by completing the reading of the second machine-readable code using the reader tool.

20. A non-transitory computer readable storage medium including instructions that, when executed by at least one processor of a computing system, cause the computing system to perform:
acquiring a first machine-readable code;
providing the first machine-readable code on a display element;
providing a reader tool for reading at least a second machine-readable code, the reader tool being provided on the display element in conjunction with the providing of the first machine-readable code on the display element such that the reader tool and the first machine-readable code are at least temporarily displayed on the display element at a same time,
wherein the second machine-readable code and a second reader tool for reading at least the first machine-readable code are provided on a second display element of a second computing system; and
initiating a reading of the second machine-readable code using the reader tool while the first machine-readable code is provided on the display element at the same time and while a representation of the second machine-readable code is displayed on the display element to appear at least partially within the reader tool, wherein the reader tool being provided on the display element enables a user to align the representation of the second machine-readable code on the display element at least partially within the reader tool on the display element,
wherein the providing the first machine-readable code on the display element and the providing the reader tool on the display element are stopped by completing the reading of the second machine-readable code using the reader tool.

\* \* \* \* \*